United States Patent
Nilsson et al.

(10) Patent No.: US 10,268,197 B2
(45) Date of Patent: Apr. 23, 2019

(54) METHOD OF TRAJECTORY PLANNING FOR YIELDING MANEUVERS

(71) Applicant: VOLVO CAR CORPORATION, Gothenburg (SE)

(72) Inventors: Julia Nilsson, Gothenburg (SE); Mattias Erik Brannstrom, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 83 days.

(21) Appl. No.: 14/858,172

(22) Filed: Sep. 18, 2015

(65) Prior Publication Data
US 2016/0091897 A1 Mar. 31, 2016

(30) Foreign Application Priority Data

Sep. 26, 2014 (EP) .................................... 14186538

(51) Int. Cl.
*G01C 21/00* (2006.01)
*G05D 1/02* (2006.01)
(Continued)

(52) U.S. Cl.
CPC ........... *G05D 1/0212* (2013.01); *B60W 30/12* (2013.01); *B60W 30/16* (2013.01); *B60W 40/04* (2013.01)

(58) Field of Classification Search
CPC .... G05D 1/0212; B60W 30/12; B60W 30/16; B60W 40/04
See application file for complete search history.

(56) References Cited

U.S. PATENT DOCUMENTS 7,519,459 B2 * 4/2009 Ito .............................. B60R 1/00
340/425.5
9,405,293 B2 * 8/2016 Meuleau .............. G05D 1/0212
(Continued)

FOREIGN PATENT DOCUMENTS

DE 102011121487 6/2013
DE 102012215060 2/2014
(Continued)

OTHER PUBLICATIONS

Extended European Search Report for European Application No. EP 14186538.6, Completed by the European Patent Office, dated Mar. 11, 2015, 4 pages.
(Continued)

*Primary Examiner* — Ian Jen
(74) *Attorney, Agent, or Firm* — Brooks Kushman P.C.

(57) ABSTRACT

The present disclosure relates to a method of trajectory planning for yielding maneuvers for an ego vehicle (E). The method may include determining a longitudinal safety corridor for the ego vehicle (E) that allows the ego vehicle (E) to longitudinally position itself between two or more surrounding objects, determining a longitudinal trajectory for the ego vehicle (E) respecting bounds given by the longitudinal safety corridor, determining a lateral safety corridor for the ego vehicle (E) using the longitudinal trajectory to determine upper and lower bounds on a lateral position of the ego vehicle (E), and determining a lateral trajectory for the ego vehicle (E) respecting bounds given by the lateral safety corridor. The present disclosure also relates to an Advanced Driver Assistance System arranged to perform the method and a vehicle (E) comprising such a system.

20 Claims, 15 Drawing Sheets

(51) Int. Cl.
*B60W 40/04* (2006.01)
*B60W 30/12* (2006.01)
*B60W 30/16* (2012.01)

(56) References Cited

U.S. PATENT DOCUMENTS

| | | | |
|---|---|---|---|
| 9,569,968 B2* | 2/2017 | Strauss | B60T 7/22 |
| 2002/0005779 A1* | 1/2002 | Ishii | B62D 15/027 |
| | | | 340/436 |
| 2002/0145665 A1* | 10/2002 | Ishikawa | B60R 1/00 |
| | | | 348/148 |
| 2002/0149476 A1* | 10/2002 | Ogura | B60R 1/00 |
| | | | 340/436 |
| 2003/0026455 A1* | 2/2003 | Watanabe | B60W 30/09 |
| | | | 382/104 |
| 2003/0076414 A1* | 4/2003 | Sato | G01S 11/12 |
| | | | 348/148 |
| 2003/0085999 A1* | 5/2003 | Okamoto | B60R 1/00 |
| | | | 348/148 |
| 2003/0222983 A1* | 12/2003 | Nobori | G01S 11/12 |
| | | | 348/148 |
| 2004/0249564 A1* | 12/2004 | Iwakiri | B62D 15/027 |
| | | | 340/932.2 |
| 2004/0260439 A1* | 12/2004 | Endo | B60Q 1/48 |
| | | | 701/36 |
| 2007/0021904 A1* | 1/2007 | Kawamata | G08G 1/161 |
| | | | 701/532 |
| 2009/0118900 A1* | 5/2009 | Adachi | B62D 15/027 |
| | | | 701/33.4 |
| 2009/0204326 A1* | 8/2009 | Knee | B62D 15/0295 |
| | | | 701/300 |
| 2010/0228419 A1* | 9/2010 | Lee | B60W 30/0953 |
| | | | 701/25 |
| 2010/0231417 A1* | 9/2010 | Kadowaki | B62D 15/027 |
| | | | 340/932.2 |
| 2012/0109610 A1* | 5/2012 | Anderson | B60W 30/09 |
| | | | 703/8 |
| 2013/0085976 A1* | 4/2013 | Bone | B60W 30/18163 |
| | | | 706/46 |
| 2013/0120161 A1* | 5/2013 | Wakabayashi | B62D 15/0295 |
| | | | 340/932.2 |
| 2013/0197804 A1* | 8/2013 | Luke | B60W 30/0956 |
| | | | 701/538 |
| 2013/0338878 A1* | 12/2013 | Fritz | B60W 10/18 |
| | | | 701/41 |
| 2014/0005875 A1* | 1/2014 | Hartmann | B60W 10/06 |
| | | | 701/23 |
| 2014/0222950 A1* | 8/2014 | Rabel | H04W 4/029 |
| | | | 709/217 |
| 2014/0229142 A1* | 8/2014 | Schrum, Jr. | G06F 17/5004 |
| | | | 703/1 |
| 2015/0086078 A1* | 3/2015 | Sibiryakov | G06T 3/4038 |
| | | | 382/104 |
| 2015/0112571 A1* | 4/2015 | Schmudderich | B60W 30/08 |
| | | | 701/93 |
| 2015/0120138 A1* | 4/2015 | Zeng | B62D 15/0265 |
| | | | 701/41 |
| 2015/0175161 A1* | 6/2015 | Breed | B60W 30/09 |
| | | | 348/148 |
| 2015/0302257 A1* | 10/2015 | Takemura | H04N 5/2171 |
| | | | 382/104 |
| 2015/0302259 A1* | 10/2015 | Oshida | B60R 1/00 |
| | | | 382/103 |

FOREIGN PATENT DOCUMENTS

| | | |
|---|---|---|
| DE | 102013201796 | 8/2014 |
| WO | 2011009009 | 1/2011 |

OTHER PUBLICATIONS

Johnson et al. IEEE Intelligent Vehicles Symposium Jun. 23, 2013, p. 605-611, XP 032501921, "Optimal Longitudinal Control Planning with Moving Obstacles".

Brannstrom et al. IEEE Transactions on Intelligent Transport Systems Sep. 2010, vol. 11, No. 3, p. 658-669, "Model-Based Threat Assessment for Avoiding Arbitrary Vehicle Collisions."

* cited by examiner

| $v_x \in \{0, 30\}$ [m/s] | $\epsilon = 0.5$ [m] |
|---|---|
| $a_x \in \{-4, 2\}$ [m/s$^2$] | $\tau = 0.5$ [s] |
| $\Delta a_x \in \{-3h, 1.5h\}$ [m/s$^2$] | $N = 20$ |
| $\vartheta = 1$ | $h = 0.5$ |
| $\kappa = 1$ | |

Fig. 11

| $v_y \in \{-5, 5\}$ [m/s] | $\phi = 1$ | $N = 20$ |
|---|---|---|
| $a_y \in \{-2, 2\}$ [m/s$^2$] | $\psi = 10$ | $h = 0.5$ |
| $\Delta a_y \in \{-0.5h, 0.5h\}$ [m/s$^2$] | | |

Fig. 12

|       | Scenario 1      | Scenario 2      |
|-------|-----------------|-----------------|
| $E$   | [0, 15, 0]      | [0, 15, 0]      |
| $S_1$ | [−10, 15, 0]    | [−10, 25, 0]    |
| $S_2$ | [−50, 15, 0]    | [−50, 25, 0]    |
| $S_3$ | [40, 15, 0]     | [40, 15, 0]     |

Fig. 13

|       | $\Delta x_0$ [m] | $v_{x_0}$ [m/s] | $a_{x_0}$ [m/s$^2$] |
|-------|------------------|-----------------|---------------------|
| $E$   | 0                | 15]             | 0                   |
| $S_1$ | 10               | 15              | 0                   |
| $S_2$ | −25              | 15              | 0                   |

Fig. 14

|  | $\Delta x_0$ [m] | $v_{x_0}$ [m/s] | $a_{x_0}$ [m/s$^2$] |
|---|---|---|---|
| $E$ | 0 | 15 | 0 |
| $S_1$ | 10 | 10 | 0 |
| $S_2$ | −45 | 15 | 0 |
| $S_3$ | −35 | 15 | 0 |

Fig. 15

METHOD OF TRAJECTORY PLANNING FOR YIELDING MANEUVERS

CROSS-REFERENCE TO RELATED APPLICATIONS

This application claims foreign priority benefits under 35 U.S.C. § 119(a)-(d) to European patent application number EP 14186538.6, filed Sep. 26, 2014, which is incorporated by reference in its entirety.

TECHNICAL FIELD

The present application relate to a method of trajectory planning for yielding maneuvers and also an Advanced Driver Assistance System arranged to perform the method as well as a vehicle comprising such an Advanced Driver Assistance System.

BACKGROUND

Over the last decades there has been significant progress within the field of autonomous vehicles. From first presented as a futuristic idea in the Futurama exhibit at the 1939 New York World's Fair, ventures such as The DARPA Grand and Urban challenge, Safe Road Trains for the Environment (SARTRE), and the Google autonomous car have demonstrated the possibility and feasibility of the technology. Nonetheless, there is still a large gap between the demonstrated technology and commercially available vehicle systems.

Current Advanced Driver Assistance Systems (ADAS), such as Adaptive Cruise Control (ACC), Lane Keeping Aid (LKA), Traffic Jam Assist (TJA), and collision warning with auto brake, have been shown to improve the driver's comfort and safety. It is therefore expected that further developed autonomous functionality will continue to contribute to enhance driver convenience, traffic efficiency, and overall traffic safety.

Several approaches to trajectory planning for yielding maneuvers have previously been proposed where the most common include but are not limited to, cell decomposition methods e.g. A*,D*, and Rapidly exploring Random Trees (RRTs), cost- and utility based evaluation functions or constraints, and optimal control.

In cell decomposition methods the state space is divided into cells which can be assigned obstacle and goal dependent costs, thus allowing trajectory planning algorithms e.g. A*, and D* or randomized sampling based algorithms e.g. RRTs to search for the optimal collision free trajectory by exploring the cell space. By their nature, cell decomposition methods can be utilized for trajectory planning for various traffic situations and maneuvers. However, the algorithms can require significant computer resources since the number of cells grows exponentially with the dimension of the state space. Moreover, the optimality of the planned trajectory is only guaranteed up to cell resolution.

Cost- and utility-based functions or constraints are commonly used due to their straightforwardness and simplicity when applied to a certain traffic situation e.g. highway driving. By e.g. adding a cost term or constraint regarding obstacle proximity, collision free trajectories can be determined. However, these types of cost functions and constraints are normally non-linear and/or non-, thus providing no guarantee of generating an optimal solution. Further, utility- and cost based approaches do not normally include a search through the configuration space but rather use the cost functions or constraints as a mean of determining which maneuver to perform within a limited set of predefined trajectories.

In terms of an optimal control framework, trajectory planning is formulated as the solution of a constrained optimal control problem over a finite time horizon. In particular, a cost function is optimized subject to a set of constraints which generally includes the vehicle dynamics, design and physical constraints, and additional constraints introduced to avoid collision with surrounding vehicles. The main advantage of resorting to the optimal control formulation is that collision avoidance is guaranteed, provided that the optimization problem is feasible.

However, vehicle dynamics and collision avoidance constraints generally result in non-linear and/or mixed integer inequalities, which may lead to prohibitive computational complexity that prevents the real-time execution of the trajectory planning algorithm. To reduce the computational burden a particular optimal control trajectory planning algorithm is therefore generally tailored to a certain traffic situation or maneuver.

Although the above mentioned methods for autonomous trajectory planning do give good results in a number of applications, they also come with various drawbacks where the main limitation involves the trade-off between required computational resources, solution optimality and verification, and ability to generate smooth collision-free trajectories which are applicable to general traffic situations.

SUMMARY

Embodiments herein aim to provide an improved, low-complexity, trajectory planning method which is applicable to both highway and urban traffic situation maneuvers such as lane changes, intersection crossing, and roundabout entry.

This is provided through a method of trajectory planning for yielding maneuvers for an ego vehicle comprising the steps of: determining a longitudinal safety corridor for the ego vehicle that allow the ego vehicle to longitudinally position itself in-between two or more surrounding objects; determining a longitudinal trajectory for the ego vehicle respecting the bounds given by the longitudinal safety corridor; determining a lateral safety corridor for the ego vehicle using the longitudinal trajectory to determine upper and lower bounds on the ego vehicle's lateral position; determining a lateral trajectory for the ego vehicle respecting the bounds given by the lateral safety corridor.

The provision of longitudinal and lateral trajectories determined as above provides for a low-complexity, trajectory planning method requiring moderate computational resources which is applicable to general traffic situations, both highway and urban traffic situation maneuvers such as lane changes, intersection crossing, and roundabout entry, whilst able to generate smooth collision-free trajectories therefore.

According to a second embodiment is provided that the step of determining a longitudinal safety corridor for the ego vehicle is arranged to allow the ego vehicle to longitudinally position itself in-between two or more surrounding objects during at least a minimum time required to pass through a yielding region.

The provision of positioning as above during at least a minimum time required to pass through a yielding region provides a certainty to be able to e.g. perform a lateral maneuver during lane change having determined the longitudinal trajectory.

According to a third embodiment is provided that the minimum time required to pass through a yielding region for a roundabout corresponds to the time required for the ego vehicle to completely enter the roundabout, and for an intersection the time required for the ego vehicle to completely traverse the intersection, and for a lane change the time required for the ego vehicle to completely leave a lane originally travelled and fully enter an adjacent lane.

The provision of defined yielding regions as above provides increased certainty to be able to perform a lateral maneuver in the above traffic situations.

According to a fourth embodiment is provided that at least one of the longitudinal and lateral trajectories for the ego vehicle is determined through formulating and solving a respective trajectory planning optimization problem.

The provision of determining the longitudinal and lateral trajectories through formulating and solving separate trajectory planning optimization problems promotes the provision of a low-complexity, trajectory planning method requiring moderate computational resources.

According to a fifth embodiment is provided that the longitudinal and lateral trajectory planning problems are defined as two loosely coupled longitudinal and lateral low-complexity receding horizon optimal control problems within a Model Predictive Control (MPC) framework.

The provision of defining the trajectory planning problems as two loosely coupled longitudinal and lateral low-complexity receding horizon optimal control problems within a Model Predictive Control (MPC) framework further promotes the provision of a low-complexity, trajectory planning method requiring moderate computational resources.

According to a sixth embodiment is provided that predicted trajectories, of the surrounding objects are considered when defining the longitudinal safety corridor.

The provision of considering predicted trajectories, of the surrounding objects allows for an appropriate definition of the longitudinal safety corridor.

According to a seventh embodiment is provided that the steps of determining a longitudinal safety corridor for the ego vehicle and determining a longitudinal trajectory for the ego vehicle are iterated over several gaps in-between two or more surrounding objects in order to find the most appropriate gap for performing the maneuver.

The provision of iterating the steps as above enables finding the most appropriate gap for performing the maneuver.

According to an eight embodiment is provided that the most appropriate gap in-between two or more surrounding objects for performing the maneuver is selected corresponding to the longitudinal optimization problem which has the best performance index.

The provision of selecting the most appropriate gap for performing the maneuver based on the best performance index, as above, provides for selection of the best gap for performing the maneuver.

According to a ninth embodiment is provided that the steps of determining a longitudinal safety corridor for the ego vehicle and determining a longitudinal trajectory for the ego vehicle are iterated in order to find a suitable time for when to initiate the maneuver.

The provision of iterating the steps as above enables finding a suitable time for when to initiate the maneuver.

According to a tenth embodiment is provided that the most appropriate time for when to initiate the maneuver is set as the time which corresponds to the longitudinal trajectory planning optimization problem which has the best performance index.

The provision of setting the time based on the best performance index, as above, enables a best timing of the maneuver.

According to an eleventh embodiment is provided that at least part of one of the longitudinal and lateral trajectories for the ego vehicle is utilized to determine longitudinal and/or lateral control signals.

The provision of determining longitudinal and lateral control signals based on at least part of one of the longitudinal and lateral trajectories for the ego vehicle enables direct interactions with vehicle control systems for performing longitudinal and lateral control of a vehicle.

According to a twelfth embodiment is provided that it further comprises the step of combining the longitudinal and lateral control signals to a combined control signal for a combined longitudinal and lateral yielding maneuver of the ego vehicle.

The provision of a combined control signal further enhances the possibility of direct interactions with vehicle control systems for performing longitudinal and lateral control of a vehicle.

According to a thirteenth embodiment is provided an Advanced Driver Assistance System arranged to perform the method of trajectory planning for yielding maneuvers according to the previously described method.

The provision of an Advanced Driver Assistance System as above enables vehicles to perform yielding maneuvers in general traffic situations, both highway and urban traffic situation maneuvers such as lane changes, intersection crossing, and roundabout entry, whilst following smooth collision-free trajectories therefore.

According to a fourteenth embodiment is provided that at least part of one of the longitudinal and lateral trajectories for the ego vehicle is utilized by the Advanced Driver Assistance System for one or more of the following: deciding if a maneuver should be initated or aborted; performing a maneuver, autonomously or driver supervised; provide driver guidance for performing a maneuver; provide driver warning and/or information when a maneuver could and should not be performed; predict a future trajectory of a surrounding object; evaluate the behavior of a surrounding object.

The provision of an Advanced Driver Assistance System as above enables versatile implementations for handling a large variety of traffic situations.

According to a fifteenth embodiment is provided a vehicle that comprises Advanced Driver Assistance System arranged to perform the method of trajectory planning for yielding maneuvers according to the previously described method.

The provision of a vehicle that it comprises an Advanced Driver Assistance System arranged to implement the method of trajectory planning for yielding maneuvers as above is able to perform yielding maneuvers in general traffic situations, both highway and urban traffic situation maneuvers such as lane changes, intersection crossing, and roundabout entry, whilst following smooth collision-free trajectories therefore.

BRIEF DESCRIPTION OF THE DRAWINGS

In the following, embodiments herein will be described in greater detail by way of example only with reference to attached drawings, in which

FIG. 4 Bottom: illustrates longitudinal velocity and acceleration trajectory for the ego vehicle's lane change maneuver, for Scenario 1 of the lane change traffic situation.

FIG. 5 Bottom: illustrates lateral velocity and acceleration trajectory for the ego vehicle's lane change maneuver, for Scenario 1 of the lane change traffic situation.

FIG. 6 Bottom: illustrates longitudinal velocity and acceleration trajectory for the ego vehicle's lane change maneuver, for Scenario 2 of the lane change traffic situation.

FIG. 7 Bottom: illustrates lateral velocity and acceleration trajectory for the ego vehicle's lane change maneuver, for Scenario 2 of the lane change traffic situation.

FIG. 9 Bottom: illustrates planned and predicted longitudinal velocity trajectory for the ego vehicle and the surrounding vehicles $S_1$, and $S_2$ for the roundabout traffic situation.

FIG. 10 Bottom: illustrates longitudinal velocity and acceleration trajectory of the ego vehicle for the intersection traffic situation.

FIG. 11 is a table illustrating general design parameters for the longitudinal control problem.

FIG. 12 is a table illustrating general design parameters for the lateral control problem.

FIG. 13 is a table illustrating initial conditions for the two scenarios of the lane change traffic situation.

FIG. 14 is a table illustrating initial conditions for the roundabout traffic scenario.

FIG. 15 is a table illustrating initial conditions for the intersection traffic scenario.

Figure 1:
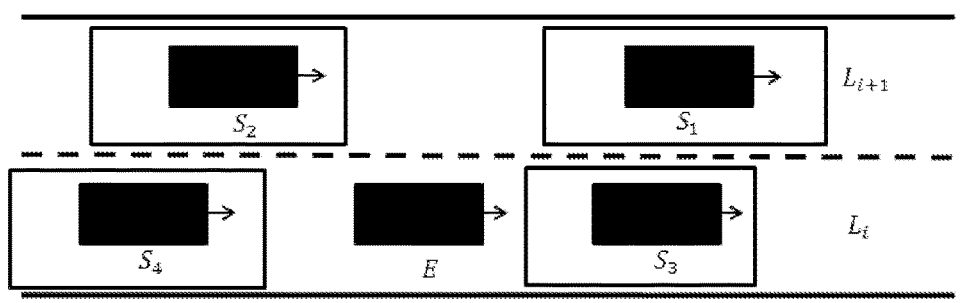
FIG. 1 is a schematic illustration of vehicles travelling on a road with two lanes.

Still other features of embodiments herein will become apparent from the following detailed description considered in conjunction with the accompanying drawings. It is to be understood, however, that the drawings are designed solely for purposes of illustration and not as a definition of the limits hereof, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

This disclosure is based on the realization that in order to increase the autonomous capability of commercial ADAS and eventually allow for fully autonomous driving functionality, a vehicle system should be able to plan how the vehicle should perform different maneuvers in terms of e.g. longitudinal and lateral position, velocity and acceleration trajectories, in order to safely and comfortably follow its planned route while accounting for, and adapting to, the surrounding environment. For that reason, this disclosure is concerned with trajectory planning for yielding maneuvers. In particular, the disclosure proposes a novel trajectory planning method which is applicable to both highway and urban traffic situation yielding maneuvers such as lane changes, intersection crossing, and roundabout entry where the vehicle does not have right of way i.e. yielding maneuvers.

The trajectories generated using the proposed method may also be used in order to make decisions if a certain maneuver should be performed or not, and also, if required, in order to decide if an initiated maneuver should be aborted. Aborting a maneuver may be appropriate if the predictions made when initiating the maneuver are no longer valid. The trajectories generated may further be used once the maneuver is performed by longitudinal and/or lateral control of ego vehicle, either by an ADAS-system where a vehicle driver supervises the maneuver or where the maneuver is executed autonomously. The trajectories generated may still further be used to provide information/support/guidance to a vehicle driver once the vehicle driver wishes to perform a maneuver. It is further feasible to use the trajectories generated to provide a warning to a vehicle driver and/or perform braking- and/or steering-interventions in order to assist a vehicle driver to abort or complete a maneuver initiated by the vehicle driver should the vehicle driver act in a manner which is judged as unsafe from a comparison with the trajectories generated in accordance with the proposed method.

By formulating the trajectory planning problem as two loosely coupled longitudinal and lateral low-complexity receding horizon optimal control problems within the Model Predictive Control (MPC) framework, smooth and comfortable collision free maneuvers can be planned in terms of the vehicle's longitudinal and lateral position, velocity, and acceleration trajectories.

Therefore, initially, a brief introduction to the standard MPC problem formulation is introduced.

Consider the linear, time-invariant, discrete time system $$x(t+1) = Ax(t) + Bu(t) \quad (1)$$

where $$x \in X \subseteq \mathbb{R}^n, u \in U \subseteq \mathbb{R}^n \quad (2)$$

are the state and input vectors, respectively, and X and U are polytopes containing the origin. Without loss of generality, assume the control objective is to control the state of system (1) to the origin, while fulfilling the state and input constraints (2).

Consider the following cost function $$J(x(t),U_t) = \|x_{t+N}\| + \Sigma_{k=0}^{N-1} \|x_{t+k}\|_P^2 + \|u_{t+k}\|_R^2 \quad (3)$$

where $U_t \triangleq [u_t^T, \ldots, u_{t+N-1}^T]^T$, $\|x\|_Q^2 \triangleq x^T Q x$ denotes the weighted, squared 2-norm, $N \in \mathbb{N}^+$ is a finite, discrete time horizon called the prediction horizon and $P \in \mathbb{R}^{n \times n}$; $Q \in \mathbb{R}^{n \times n}$; $R \in \mathbb{R}^{m \times m}$ are weighting matrices. In MPC, at every time instant t, the following finite time, constrained optimal control problem is formulated and solved $$\min_{u_t} J(x(t), U_t) \quad (4a)$$

subject to $$X_{t+k+1} = AX_{t+k} + BU_{t+k} \quad (4b)$$

$$x_t = x(t) \quad (4c)$$

$$x_{t+k} \in X, k=1, \ldots, N, \quad (4d)$$

$$u_{t+k} \in U, k=0, \ldots, N-1, \quad (4e)$$

where the control input is the state feedback law $u^*(x(t))$ obtained from the first element of the solution $U_t^*$ to the problem (4). The problem (4) is solved in receding horizon, i.e. every time instant the problem (4) is formulated and solved based on the current state x (t), over a shifted time horizon. If the sets X; U in (4d)-(4e) are, then the MPC problem (4) can be equivalently rewritten as a standard QP problem $$\min_{u_t} J = \frac{1}{2} w^T H w + d^T w \quad (5a)$$

subject to $$H_{in} w \leq K_{in} \quad (5b)$$

$$H_{eq} w = K_{eq} \quad (5c)$$

with $w \triangleq [U_t, x_{t+1}^T, \ldots, x_{t+N}^T]^T$. The QP problem (5) is if the matrix H is symmetric and positive semi definite.

Thus, in order to overcome the prior-art limitations, and meet the requirements of commercial autonomous vehicle technology, this disclosure presents a novel, low-complexity, trajectory planning method which is applicable to both highway and urban traffic situation maneuvers such as lane changes, intersection crossing, and roundabout entry.

Similar to the approach taken in J. Johnson and K. Hauser, "Optimal Longitudinal Control Planning with Moving Obstacles,"IEEE Intelligent Vehicles Symposium", pp. 605-611, June, 2013, the proposed method considers trajectory planning as the problem of positioning the vehicle in empty gaps in-between two or more surrounding objects in the traffic environment. However, in contrast thereto the proposed method considers both the longitudinal and lateral control aspects of trajectory planning, and the corresponding optimal control formulation allows for planning of smooth and comfortable collision free trajectories which resembles human natural driving behaviour.

FIG. 1 illustrates vehicles travelling on a road with two lanes, $L_i$ and $L_{i+1}$, the ego vehicle E and the surrounding vehicles $S_1$, $S_2$, $S_3$ and $S_4$. The boxes around surrounding vehicles $S_1$, $S_2$, $S_3$ and $S_4$ indicate safety regions which the ego vehicle E should not enter. A yielding region for a lane change in FIG. 1 is a region required for the ego vehicle (E) to completely leave the lane originally travelled and fully enter the adjacent lane, i.e. the ego vehicle (E) should yield to other traffic while traversing a lane marker between the two adjacent lanes and until the lane marker has been traversed safely and the ego vehicle (E) is fully transferred to the adjacent lane.

Consider the highway traffic scenario depicted in FIG. 1. The ego vehicle E drives in a lane $L_i$ and two surrounding vehicles $S_1$ and $S_2$ are driving in an adjacent lane $L_{i+1}$. In order for the ego vehicle E to change lanes from $L_i$ to $L_{i+1}$, the ego vehicle E has the options of positioning itself ahead of the foremost vehicle $S_1$, in the gap in-between the foremost vehicle $S_1$ and its following vehicle $S_2$, or behind its following vehicle $S_2$. However, by respectively considering the options of the ego vehicle E positioning itself ahead of the foremost vehicle $S_1$ or behind its following vehicle $S_2$ positioning the ego vehicle E in the gap in-between the foremost vehicle $S_1$ or its following vehicle $S_2$ and some other surrounding vehicle, these three options are actually only different versions of the same problem i.e. positioning the ego vehicle E in a gap in-between two surrounding vehicles.

Figure 3:
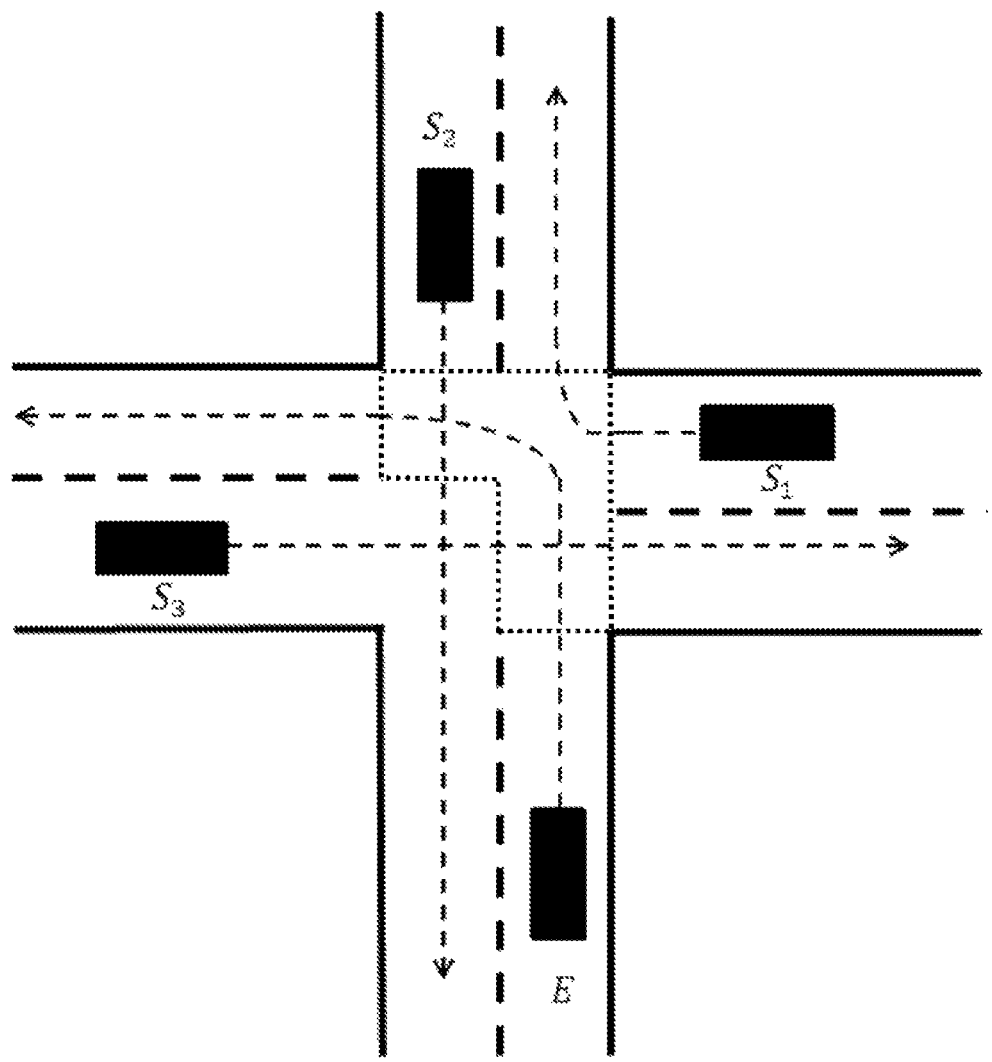
FIG. 3 is a schematic illustration of vehicles traversing a cross intersection.
Figure 8:
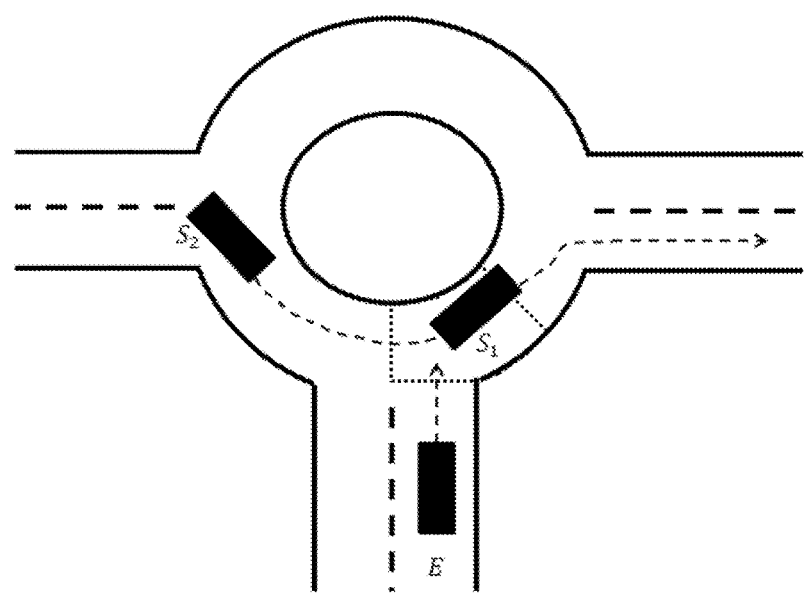
FIG. 8 is a schematic illustration of vehicles traversing a roundabout where the dashed arrows represent the predicted paths of $S_1$, and $S_2$, and the planned route of the ego vehicle.

When considering traffic scenarios such as entering a roundabout, FIG. 8, or crossing an intersection, FIG. 3, it becomes evident that these trajectory planning problems can be reduced to positioning the ego vehicle E in a gap in-between two or more surrounding vehicles. The problem of positioning the ego vehicle E in a gap in-between two or more surrounding vehicles is thus applicable to many traffic situations where the ego vehicle E does not have right of way and therefore needs to adapt its behaviour to the surrounding vehicles, i.e. yield. The dotted area of the intersection of FIG. 3 and the dotted area of the roundabout of FIG. 8 illustrate yielding regions, i.e. regions where the ego vehicle E should yield for certain oncoming traffic when traversing these regions.

The trajectory planning problem for yielding maneuvers can thereby be formulated as described in the following: given that the ego vehicle E should adapt its behaviour to surrounding objects, determine the longitudinal and lateral trajectory that allow the ego vehicle E to position itself in the gap in-between two or more surrounding objects.

Further, the maneuver should not significantly disturb the surrounding objects and be planned such that the ego vehicle E keeps its desired velocity, $v_{xdes}$, while maintaining a safe distance to all surrounding objects,
retaining the ego vehicle E within the road boundaries, and
respecting the ego vehicle's E physical and design limitations.

Figure 2:
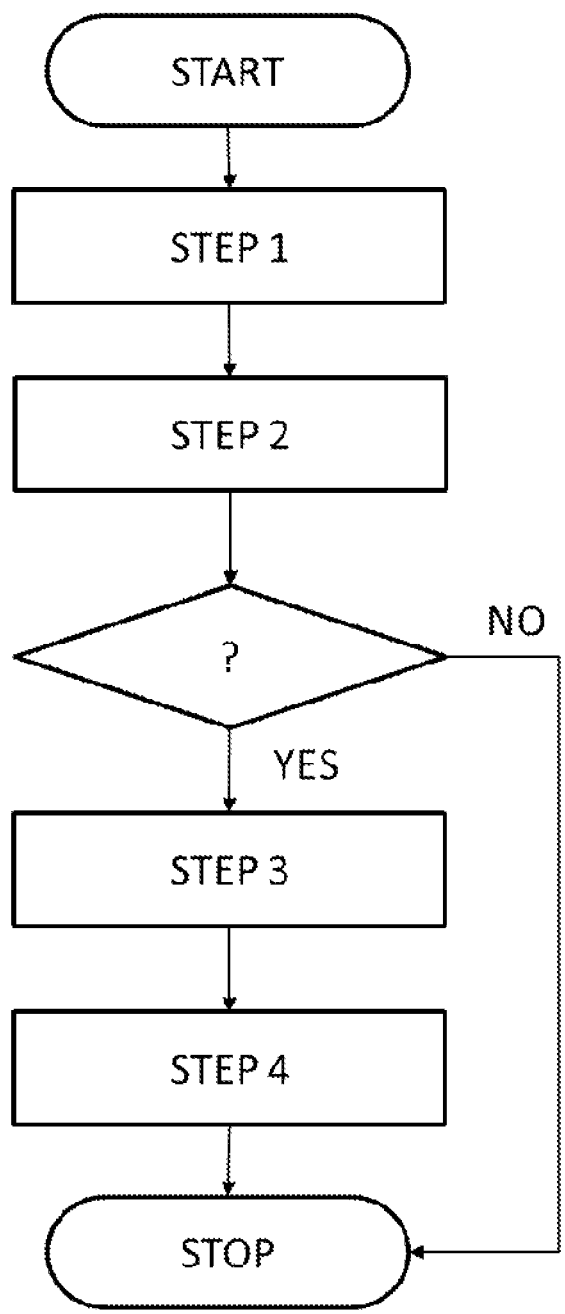
FIG. 2 is a schematic illustration of the structure of the trajectory planning algorithm.

The structure of the proposed trajectory planning method is schematically illustrated in FIG. 2. As can be seen in FIG. 2, the general idea of the method can be divided into four main steps.

STEP 1) Determine the longitudinal safety corridor for the ego vehicle (E) that allow the ego vehicle (E) to longitudinally position itself in-between two or more surrounding objects ($S_1, \ldots, S_n$).

Given a target gap i.e. the surrounding objects which the ego vehicle E should position itself in-between, for the planned trajectory to be feasible, the ego vehicle E should be positioned in the gap for at least the minimum time it takes to perform the maneuver e.g. a lane change, roundabout entry or intersection crossing. This corresponds to upper and lower bounds on the ego vehicle's E longitudinal position which determines a longitudinal safety corridor in which the ego vehicle E should be positioned during the maneuver. Further details regarding how the longitudinal safety corridor is defined is provided in the following.

STEP 2) Determine the longitudinal trajectory for the ego vehicle (E) respecting the bounds given by the longitudinal safety corridor.

Once the longitudinal safety corridor has been determined, the longitudinal trajectory can be formulated and solved as an optimization problem as will be described in more detail in the following. The longitudinal trajectory may in some embodiments be determined in terms of longitudinal control signals.

If it is determined that the longitudinal trajectory is feasible, as illustrated by the decision box indicated with a question mark, the method proceeds to STEP 3.

STEP 3) Determine the lateral safety corridor for the ego vehicle (E) using the longitudinal trajectory to determine upper and lower bounds on the ego vehicle's (E) lateral position.

The longitudinal trajectory is used to determine the upper and lower bounds on the ego vehicle's E lateral position which corresponds to a lateral safety corridor which the ego vehicle E should be positioned in during the maneuver. Further details regarding how the lateral safety corridor is defined will be described in more detail in the following.

STEP 4) Determine the lateral trajectory for the ego vehicle (E) respecting the bounds given by the lateral safety corridor.

Respecting the bounds given by the lateral safety corridor, the lateral trajectory can be formulated and solved as an optimization problem as will be described in more detail in the following. The lateral trajectory may in some embodiments be determined in terms of longitudinal control signals.

A trajectory planning algorithm is formulated based on the following set of assumptions:

The first assumption, A1, is that the ego vehicle E is equipped with a sensing system which measure its own position within the road and the respective relative positions and velocities of surrounding objects i.e. it is assumed that all required sensor measurements are available.

Such a sensing system may comprise sensors such as, e.g. one or more of a Radio Detection And Ranging (RADAR) sensor, a Light Detection And Ranging (LIDAR) sensor, a Light Amplification by Stimulated Emission of Radiation (LASER) sensor, a SOund NAvigation and Ranging (SONAR) sensor (e.g. ultrasound), an InfraRed (IR) sensor, an image sensor (e.g. camera), vehicle location devices (e.g. GPS) or any combinations thereof.

The second assumption, A2, is that the behavior of surrounding objects is predictable over a time horizon. Surrounding objects may be other vehicles or other type of road users, such as e.g. pedestrians, etc.

The third assumption, A3, is that the ego vehicle E is equipped with low-level control systems which are capable of following the planned trajectory. E.g. Control systems for executing steering and acceleration/deceleration (e.g. systems for throttling and braking) of the ego vehicle E.

To ensure a safe behavior of the ego vehicle E a trajectory should be planned so that the ego vehicle E does not enter safety regions as indicated by the rectangular boxes around each surrounding object $S_1$-$S_4$ in FIG. 1. With respect to the longitudinal motion of the ego vehicle E, this means that the ego vehicle E should be positioned within a longitudinal safety corridor which defines upper and lower boundaries on its longitudinal position at each time instance over the prediction time horizon.

Some examples of longitudinal safety corridors for lane change, roundabout and intersection traffic situations are illustrated in FIGS. 4, 6, 9, and 10.

The longitudinal safety corridor is determined by the predicted interaction between the ego vehicle E and its surrounding environment.

It is therefore defined slightly different depending on the traffic situation. In the following subsections the longitudinal safety corridor is defined for lane change, roundabout and intersection traffic situations respectively.

Before the ego vehicle E has initiated a lane change maneuver it should be able to follow a potentially preceding vehicle $S_3$ travelling in the same lane at a safe distance, $$s_d = \min(\epsilon, \tau v_x) \qquad (6)$$

where $\epsilon$ denotes a minimum safe distance and $\tau$ denotes the desired time gap. Prior to the time instance when the lane change maneuver is initiated, $T_{LC_{in}}$ the upper bound on the ego vehicle's E longitudinal position is hence determined by $S_3$ as $$X_{max\ k} = X_{S_3 k} - s_d, \forall k=0, \ldots, T_{LC_{in}} \qquad (7)$$

where $x_{S_3}$ denotes the longitudinal position of $S_3$.

Once the lane change maneuver is initiated, the upper boundary on the ego vehicle's E longitudinal position is determined by $$X_{max\ k} = \min(x_{S_1 k}, x_{S_3 k}) - S_d, \forall k = T_{LC_{in}}, \ldots, T_{LC_e} \qquad (8)$$

where $x_{S_1}$ denotes the longitudinal position of $S_1$ and $T_{LC_e}$ denotes the time when the lane change maneuver is completed i.e.

$$T_{LC_e} = T_{LC_{in}} + t_{min} \qquad (9)$$

and $t_{min}$ is the minimum time it takes to pass through a yielding region. In a lane change maneuver, $t_{min}$ may e.g. be estimated as described in the following: (Note however that the presented algorithm is just one example on how the proposed method can be realized in practice and other alternative algorithm formulation options will be available to the person skilled in the art).

$$d_y = v_y t_{min} + \frac{a_{y_{max}} t_{min}^2}{2} \qquad (10a)$$

$$\Rightarrow t_{min} = -\frac{v_y}{a_{y_{max}}} + \sqrt{\left(\frac{v_y}{a_{y_{max}}}\right)^2 + \frac{2 d_y}{a_{y_{max}}}} \qquad (10b)$$

where $d_y$ is the lateral distance required to completely leave the original lane travelled and fully enter an adjacent lane, $v_y$ is the lateral velocity of the ego vehicle E, and $a_{y_{max}}$ is the maximal lateral acceleration determined by $$a_{y_{max}} = \min(a_{y_{max}}^{comfort}, a_{y_{max}}^E) \qquad (11)$$

where $a_{y_{max}}^{comfort}$ denotes the maximal lateral acceleration which corresponds to a smooth lane change maneuver, and $a_{y_{max}}^E$ is the maximal lateral acceleration which fulfils the dynamic constraints of the ego vehicle E calculated as in: M. Brannstrom, E. Coelingh, and J. Sjöberg, "Model-Based Threat Assessment for Avoiding Arbitrary Vehicle Collisions," IEEE Transactions on Intelligent Transport Systems, vol. 11, no. 3, pp. 658-669, September, 2010, which calculation methodology is hereby incorporated by reference in its entirety.

When the lane change maneuver has been completed, the ego vehicle E should be able to follow surrounding vehicle $S_1$ at a safe distance.

Hence, the upper boundary on the ego vehicle's E longitudinal position after the lane change maneuver has been completed is determined by $$x_{max\ k} = x_{S_1 k} - s_d, \forall k = T_{LC_e}, \ldots, N \tag{12}$$

Similarly, the lower boundary on the longitudinal position of the ego vehicle E is determined by $$x_{min\ k} = x_{S_4 k} + s_d, \forall k = 0, \ldots, T_{LC_{in}} \tag{13a}$$

$$x_{min\ k} = \max(x_{S_2 k}, x_{S_4 k}) + s_d, \forall k = T_{LC_{in}}, \ldots, T_{LC_e} \tag{13b}$$

$$x_{min\ k} = x_{S_2 k} + s_d, \forall k = T_{LC_{in}}, \ldots, N \tag{13c}$$

where $x_{S_4}$ denotes the longitudinal position of surrounding vehicle $S_4$.

If several lane change maneuvers are required in order to reach the ego vehicle's E desired target lane, the upper and lower bounds on the ego vehicle's E longitudinal position can be determined by repeating the above described min/max operations (7), (8), (12), (13), over each lane with the corresponding surrounding vehicles. The same methodology applies when determining the longitudinal safety corridor of an overtake maneuver which by its nature constitutes double lane change maneuvers.

Since the time when to initiate the lane change maneuver affects how the upper and lower boundaries on the ego vehicle's E longitudinal position is defined, the lane change algorithm iterates step 1 and step 2 in order to find a suitable time for when to initiate the lane change maneuver. Hence, $T_{LC_{in}}$ is set repeatedly over a time interval, after which the corresponding upper and lower boundaries on the longitudinal position of the ego vehicle E is determined and the longitudinal control signals are computed in step 2. The most appropriate time for when to initiate the lane change maneuver is then set as the time which corresponds to the longitudinal optimization problem which has the best performance index.

When computing the longitudinal safety corridor it is assumed that the lane change maneuver is performed during $t_{min}$. However, although the lower and upper boundaries on the longitudinal position of the ego vehicle E is set with respect to the assumed time to perform the lane change i.e. $t_{min}$, the solution of the longitudinal control problem in step 2 might entail the ego vehicle E being positioned in the allowed lane change region during a longer time interval. Therefore, when computing the lateral safety corridor in step 3, the constraints on the lateral position of the ego vehicle E are set with respect to the actual time the ego vehicle E is positioned in the lane change region rather than $t_{min}$, thus allowing for smooth and safe lane change maneuvers.

If the behaviour prediction in Assumption A2 entails any lane change maneuvers of the surrounding vehicles, this behaviour can be incorporated when determining the longitudinal safety corridor by at each time instance letting the upper boundary in each lane be determined by the closest preceding vehicle in that particular lane and the lower boundary can be determined by the closed trailing vehicle in each lane with respect to the ego vehicle E.

Similarly to a lane change maneuver, in order to traverse a roundabout, as illustrated in FIG. 8, the ego vehicle E should merge into the roundabout by positioning itself in an appropriate gap in-between the surrounding vehicles. Since a roundabout can be considered as a special type of intersection, the required maneuver to cross an intersection can thereby also be planned so that the ego vehicle E traverses the intersection in the gaps between surrounding vehicles. For instance, consider a cross intersection as depicted in FIG. 3 where the ego vehicle E should traverse the intersection while accounting for the surrounding vehicles $S_1$, $S_2$, and $S_3$. Hence, given the predicted trajectories of the surrounding vehicles $S_1$, $S_2$, and $S_3$, the ego vehicle E should determine whether to cross the intersection before or after each of the surrounding vehicles $S_1$, $S_2$, and $S_3$. Assuming that the ordering i.e. gap selection is given, the longitudinal safety corridor can be determined.

As an example, assume the ego vehicle E is traversing the intersection ahead of surrounding vehicle $S_3$ and after surrounding vehicles $S_1$ and $S_2$. From the predicted trajectories of the surrounding vehicles $S_1$, $S_2$, and $S_3$ the time interval when the trajectory of each surrounding vehicle vehicles $S_1$, $S_2$, and $S_3$ overlaps the ego vehicle's E planned route through the intersection can be determined. Thereby, the upper bound on the ego vehicle's E longitudinal position is given by $$x_{max\ k} = x_{S_j k} - s_d, \forall k = T_{in_s j}, \ldots, T_{e_s j}; j = 1, 2, \tag{14}$$

where $$x_{max\ k} = \min(x_{s_1 k}, x_{s_2 k}) - s_d, \forall k = [T_{in_s 1}, \ldots, T_{e_s 1}] \cap [T_{in_s 2}, \ldots, T_{e_s 2}] \tag{15}$$

and $T_{in_s j}$; $j = \{1, 2\}$, and $T_{e_s j}$; $j = \{1, 2\}$, respectively denotes the start and end time for when the trajectory of $S_j$; $j = \{1, 2\}$, intersects with the planned route of the ego vehicle E.

Similarly, the lower boundary on the ego vehicle's E longitudinal position is determined by $$x_{max\ k} = x_{S_3 k} - s_d, \forall k = T_{in_s 3}, \ldots, T_{e_s 3} \tag{16}$$

where $T_{in_s 3}$ and $T_{e_s 3}$ respectively denotes the start and end time for when the trajectory of the surrounding vehicle $S_3$ intersects with the planned route of the ego vehicle E.

Whether the ego vehicle E traverses the intersection or roundabout before or after each of the surrounding vehicles i.e. the gap selection, affects how the upper and lower boundaries on the ego vehicle's E longitudinal position are defined. Note that at intersections, the ego vehicle E may not necessarily have to give right of way to all surrounding vehicles, depending e.g. on the intersection layout. However, if it is predicted that another vehicle will not give right of way to E this should of course be accounted for to reduce the risk of an accident.

Therefore the trajectory planning algorithm can iterate steps 1 and 2 over several gaps in order to find a suitable gap. The most appropriate gap for performing the maneuver corresponds to the longitudinal optimization problem which has the best performance index.

Traffic situations including e.g. pedestrian crossing and traffic lights can be considered as special types of intersections since a decision should be made regarding when to cross a certain road segment with respect to surrounding objects. The same methodology for determining the longitudinal safety corridor is thereby applicable for these types of traffic situations.

The longitudinal dynamics of the ego vehicle E may, as illustrated below, be modelled by a simple double integrator, so that the motion of the ego vehicle E can be linearly expressed as $$x_{k+1} = x_k + v_{x_k} h + a_{x_k} \frac{h^2}{2}; \quad (17a)$$
$$k = 0, \ldots, N,$$

$$v_{x_{k+1}} = x_{x_k} + a_{x_k} h, \quad (17b)$$
$$k = 0, \ldots, N,$$

where x, $v_x$ and $a_x$ respectively denotes the ego vehicle's E longitudinal position, velocity and acceleration, and h denotes the discrete sampling time.

However, it should be clear to the person skilled in the art that this is just one example of how the longitudinal dynamics of the ego vehicle E may be modelled. A number of alternative modeling options are also feasible.

Further, the system described by (17) is subjected to the following set of constraints $$x_{min} \leq x_k \leq x_{max}, k=0, \ldots, N, \quad (18a)$$

$$v_{x_{min}} \leq v_{x_k} \leq v_{x_{max}}; k=0, \ldots, N, \quad (18b)$$

$$a_{x_{min}} \leq a_{x_k} \leq a_{x_{max}}; k=0, \ldots, N, \quad (18c)$$

$$\Delta a_{x_{min}} \leq \Delta a_{x_k} \leq \Delta a_{x_{max}}; k=1, \ldots, N, \quad (18d)$$

where $\Delta a_{x_k} = a_{x_k} - a_{x_{k-1}}$. Constraint (18a) ensures that the ego vehicle E remains within the longitudinal safety corridor while inequality (18b) limits the longitudinal velocity and constrains the ego vehicle E to the allowed speed limits. Conditions (18c)-(18d) respectively limit the longitudinal acceleration and jerk in order to allow for smooth and comfortable maneuvers. Further, conditions (18c)-(18d) ensure that the planned trajectory is within the capability of the assumed low-level control systems (i.e. Assumption A3).

Since the sets X, U of feasible states and control inputs i.e. x, $v_x \in X$ and $a_x \in U$ are, the longitudinal control problem can be written as a standard quadratic program (5) where $$w_x \triangleq [x_k, v_{x_k}, a_{x_k}], k=0, \ldots, N,$$

condition (5b) corresponds to the system dynamics (17), the inequality constraint (5c) corresponds to the set of constraints (18) and the performance index J may e.g. be defined as $$J = \Sigma_{k=0}^N \partial (v_{x_k} - v_{x_{des}})^2 + k a_{x_k}^2 \quad (19)$$

where $\partial$ and k are positive scalar weights.

However, it should be clear to the person skilled in the art that this is just one example of a usable cost function/performance index J. A number of alternative cost functions/performance indexes are also feasible.

The optimization problem has N optimization variables i.e. control input $a_x$, and 11N linear constraints corresponding to system dynamics (17) and physical and design constraints (18).

The lateral safety corridor defines the upper and lower bounds on the ego vehicle's E lateral position which ensure a safe behaviour of the ego vehicle E. It is determined by the longitudinal trajectory of the ego vehicle E correlated to the maneuver and road properties.

As mentioned above the constraints on the lateral position of the ego vehicle E should be set with respect to the actual time the ego vehicle E is positioned in the lane change region rather than $t_{min}$. Hence, given $T_{LC_{in}}$, $T_{LC_e}$ in (9) is redefined as follows $$T_{LC_{e^*}} = T_{LC_{in}} + \min(t_{max}, t_{LCR}) \quad (20)$$

where $t_{max}$ is the maximum allowed time for performing a lane change maneuver, and $t_{LCR}$ denotes the time which the ego vehicle E is positioned in the lane change region.

For a traffic scenario with a left lane change the upper bound of the lateral safety corridor is given by $$y_{maxk} = L_{l_ik}; \forall k=0, \ldots, T_{LC_{in}}, \quad (21a)$$

$$y_{maxk} = L_{l_{i+1}k}; \forall k=T_{LC_{in}}, \ldots, N, \quad (21b)$$

and the lower bound on the lateral safety corridor for a left lane change is given by $$y_{mink} = L_{r_ik}; \forall k=0, \ldots, T_{LC_{in}}, \quad (22a)$$

$$y_{mink} = L_{r_{i+1}k}; \forall k=T_{LC_{in}}, \ldots, N, \quad (22b)$$

where $L_i$ denotes the current lane of the ego vehicle E, $L_{i+1}$ and $L_{i-1}$ respectively corresponds to the left and right lane of $L_i$, and l and r respectively denotes the left and right lane boundary of the i:th lane.

For a right lane change, the corresponding upper and lower bounds of the lateral safety corridor is determined by $$y_{maxk} = L_{l_ik}; \forall k=0, \ldots, T_{LC_e}, \quad (23a)$$

$$y_{maxk} = L_{l_{i-1}k}; \forall k=T_{LC_e}, \ldots, N, \quad (23b)$$

and $$y_{mink} = L_{r_ik}; \forall k=0, \ldots, T_{LC_{in}}, \quad (24a)$$

$$y_{min \ k} = L_{r_{i-1}k}; \forall k=T_{LC_{in}}, \ldots, N, \quad (24b)$$

For a roundabout or an intersection maneuver the lateral safety corridor primarily corresponds to the lane boundaries, either given by the physical lane markings or virtually generated based on the ego vehicle's E route.

Similarly to the longitudinal dynamics, the lateral dynamics of the ego vehicle E can be modelled by a simple double integrator so that the lateral motion of the ego vehicle E can be linearly expressed as $$y_{k+1} = y_k + v_{y_k} h + a_{y_k} \frac{h^2}{2} \quad (25a)$$
$$k = 0, \ldots, N,$$

$$v_{y_{k+1}} = v_{y_k} + a_{y_k} h \quad (25b)$$
$$k = 0, \ldots, N,$$

where y, $v_y$ and $a_y$ respectively denote the ego vehicle's E lateral position, velocity and acceleration. Further, the system described by (25) is subjected to the following set of constraints $$y_{min} \leq y_k \leq y_{max} \ k=0, \ldots, N, \quad (26a)$$

$$v_{y_{min}} \leq v_{y_k} \leq v_{y_{max}} \ k=0, \ldots, N, \quad (26b)$$

$$a_{y_{min}} \leq a_{y_k} \leq a_{y_{max}} \ k=0, \ldots, N, \quad (26c)$$

$$\Delta a_{y_{min}} \leq \Delta a_{y_k} \leq \Delta a_{y_{max}} \ k=1, \ldots, N, \quad (26d)$$

where $\Delta a_{y_k} = a_{y_k} - a_{y_{k-1}}$. Constraint (26a) ensures that the ego vehicle E remains within the lateral position limits defined by the lateral safety corridor. Constraints (26b)-(26d) respectively limit the lateral velocity, acceleration and jerk in order to allow for smooth and comfortable maneuvers.

Further, constraints (26b)-(26d) ensure that the planned trajectory is within the capability of the assumed low-level control systems (i.e. Assumption A3).

Since the sets X, U of feasible states and control inputs i.e. y, $v_y \in X$ and $a_y \in U$ are, the lateral control problem can be written as a standard quadratic program (5) where $$w_y \triangleq [y_k, v_{y_k}, a_{y_k}] k=0, \ldots, N,$$

condition (5b) corresponds to the system dynamics (25), the inequality constraint (5c) corresponds to the set of constraints (26) and the performance index J is defined as $$J_y = \Sigma_{k=0}^{N} \phi v_{y_k}^2 + \psi a_{y_k}^2 \qquad (27)$$

where $\phi$ and $\psi$ are positive scalar weights.

The optimization problem has N optimization variables i.e. control input $a_y$, and 11N linear constraints corresponding to system dynamics (25) and physical and design constraints (26).

The proposed trajectory planning method and its associated algorithm has been evaluated in simulated lane change, roundabout, and intersection traffic situations. Examples of design parameters for the longitudinal and lateral control optimization problems are given in the tables illustrated in FIGS. 11 and 12 respectively.

The lane change traffic situation, as illustrated in FIG. 1, considers a one-way, two-lane highway where the ego vehicle E initially drives in the right lane with a preceding vehicle $S_3$ driving in the same lane, and the surrounding vehicles $S_1$ and $S_2$ driving in the adjacent left lane. The aim of the trajectory planning algorithm for the lane change traffic situation is to plan a lane change maneuver which allows the ego vehicle E to change lanes from right to left in the gap in-between $S_1$ and $S_2$.

Two scenarios of the lane change traffic situation is considered, referred to as Scenario 1 and Scenario 2, for which the initial conditions are given in the table illustrated in FIG. 13. In both scenarios it is assumed that the surrounding vehicles $S_1$; $S_2$; and $S_3$, drives at constant longitudinal velocity without performing any lane change maneuvers over the prediction horizon according to Assumption A2. This is a simplicity assumption in order to easily illustrate the trajectory planning algorithm. However, any predicted behaviour i.e. trajectory, of the surrounding vehicles can be incorporated into the algorithm when defining the longitudinal safety corridor as described above. Further, uncertainties resulting from e.g. the sensor measurements and behaviour prediction can be taken into account by for instance increasing the safety distance, $s_d$, which the ego vehicle E should maintain to its surrounding vehicles. Furthermore, the method is also applicable to overtaking maneuvers, where oncoming traffic exist, in order to establish if and how one should perform an overtaking maneuver with a double lane change without getting to close to both oncoming traffic as well as traffic in the lane originally travelled.

In Scenario 1, all vehicles i.e. E, $S_1$, $S_2$ and $S_3$, initially drives at the same longitudinal velocity. From FIG. 4 it can be seen that in order for the ego vehicle E to change lanes in the gap in-between surrounding vehicles $S_1$ and $S_2$ its velocity should be reduced in order to align itself with the gap. Once the ego vehicle E is positioned in the gap its velocity will increase in order to maintain safe distance to surrounding vehicles $S_1$ and $S_2$. Hence, Scenario 1 illustrates the ability of the trajectory planning algorithm to plan lane change maneuvers which require the ego vehicle E to decelerate into the lane change gap.

In Scenario 2, the ego vehicle E and surrounding vehicle $S_1$ initially drives at the same longitudinal velocity which is lower than the velocity of surrounding vehicles $S_2$ and $S_3$. From FIG. 6 it can be seen that in order for the ego vehicle E to change lanes in the gap in-between surrounding vehicles $S_1$ and $S_2$ it should increase its velocity. Hence, Scenario 2 illustrates the ability of the trajectory planning algorithm to plan lane change maneuvers which require the ego vehicle E to accelerate into the lane change gap.

Figure 4:
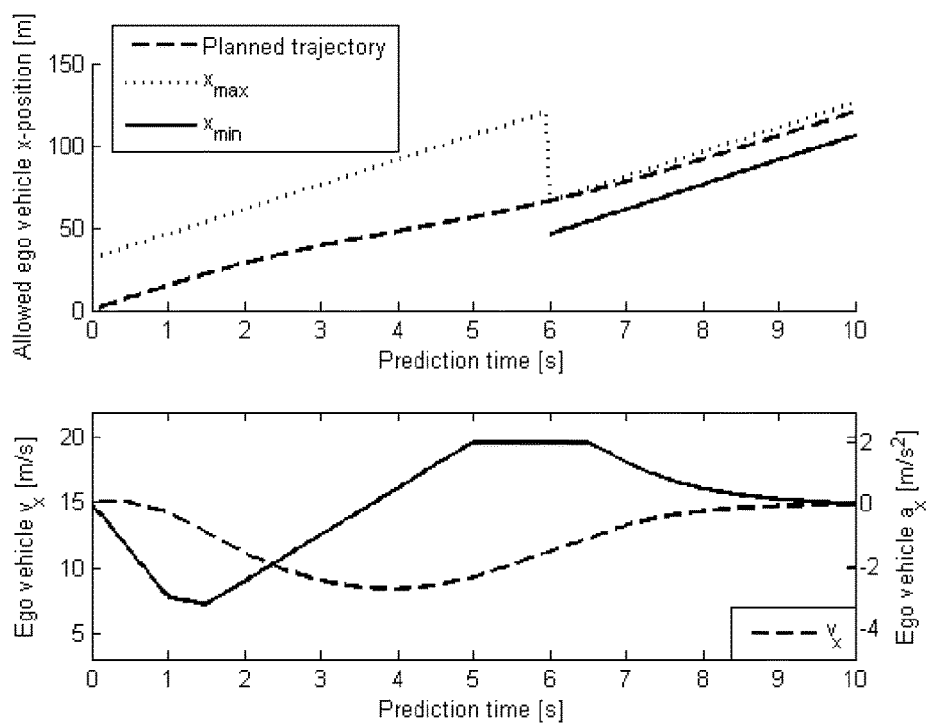
FIG. 4 Top: illustrates longitudinal position trajectory for the ego vehicle's lane change maneuver, respecting the longitudinal safety corridor defined by $x_{max}$, and $x_{min}$ for Scenario 1 of the lane change traffic situation.
Figure 5:
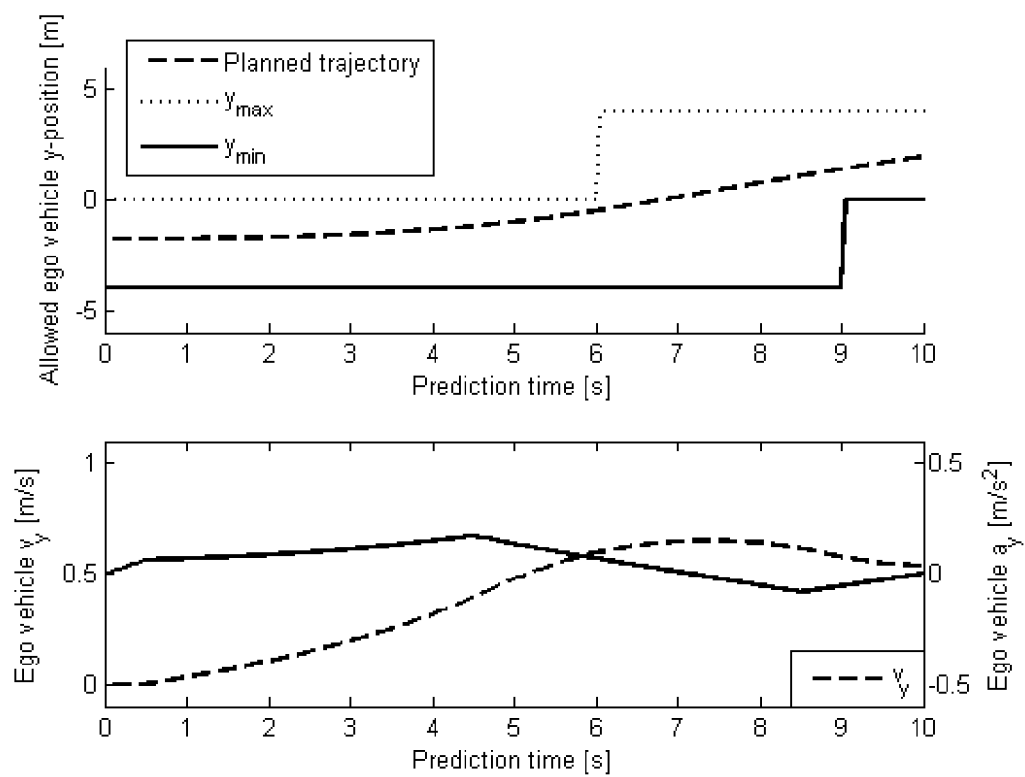
FIG. 5 Top: illustrates lateral position trajectory for the ego vehicle's lane change maneuver, respecting the lateral safety corridor defined by $y_{max}$ and $y_{min}$ for Scenario 1 of the lane change traffic situation.
Figure 6:
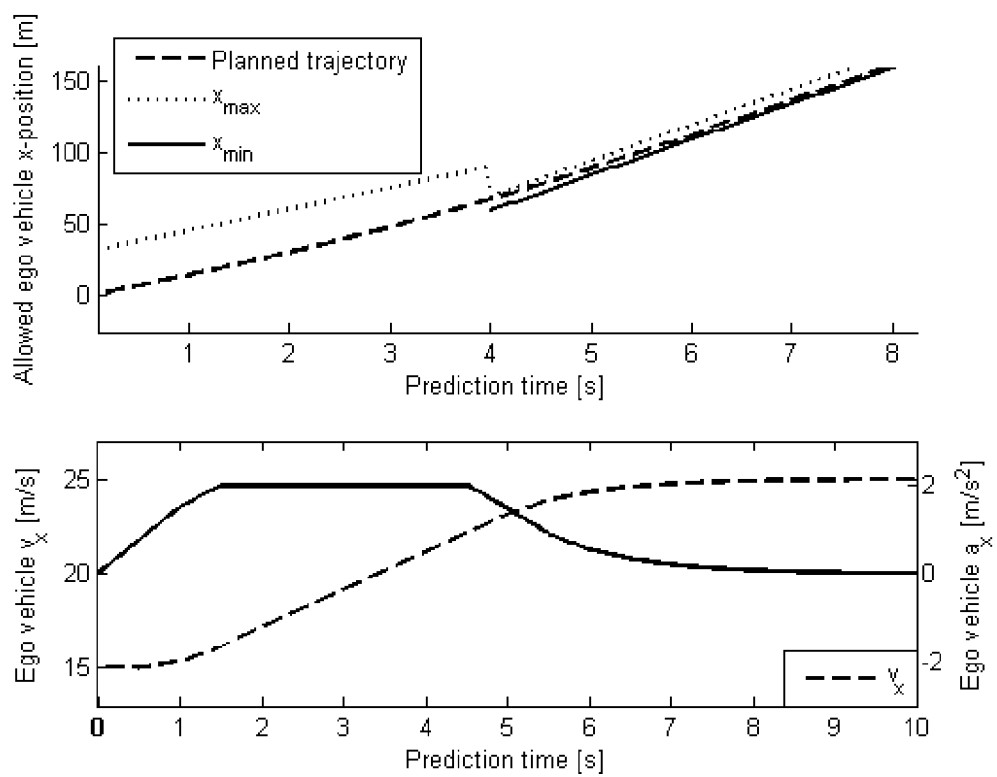
FIG. 6 Top: illustrates longitudinal position trajectory for the ego vehicle's lane change maneuver, respecting the longitudinal safety corridor defined by $x_{max}$, and $x_{min}$ for Scenario 2 of the lane change traffic situation.
Figure 7:
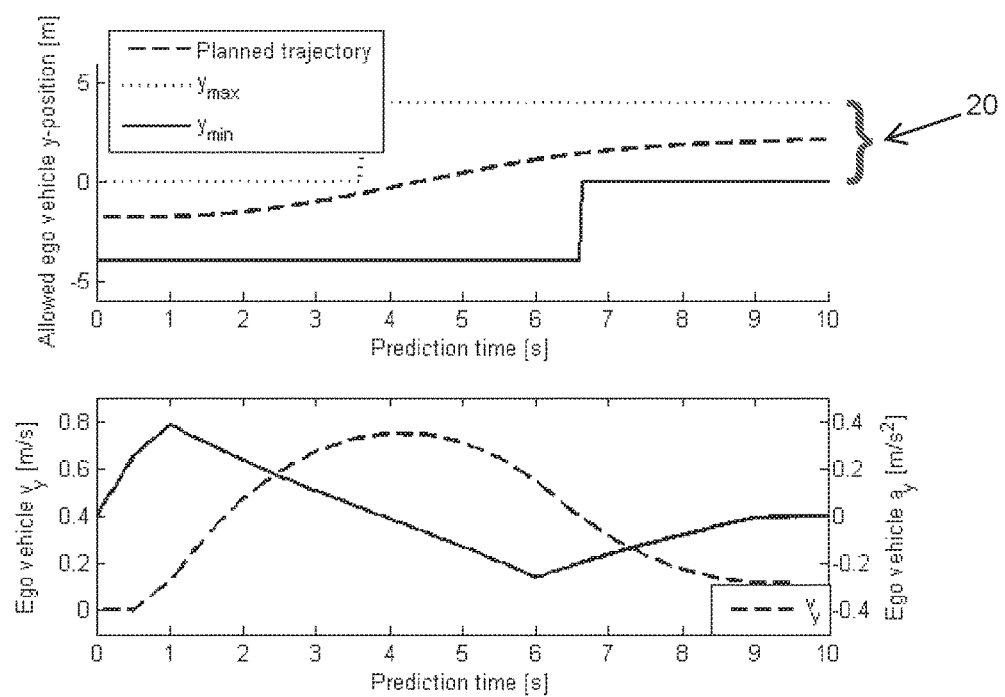
FIG. 7 Top: illustrates lateral position trajectory for the ego vehicle's lane change maneuver, respecting the lateral safety corridor defined by $y_{max}$ and $y_{min}$ for Scenario 2 of the lane change traffic situation.

The lateral safety corridor and the corresponding lateral position trajectory of the lane change maneuver for the Scenario 1 and 2 with the initial conditions of the ego vehicle E $[y_0, v_{y_0}, a_{y_0}] = [-1.75, 0, 0]$ are shown in FIGS. 5-7 respectively. In FIG. 5 it can be seen that because of (20) with $t_{max}=3$ s the lane change maneuver is completed in 3 seconds although as can be seen in FIG. 4, the ego vehicle E is positioned in the lane change region during a longer time interval.

FIG. 7 illustrates: top: The lateral position trajectory for the ego vehicle's E lane change maneuver, respecting the lateral safety corridor 20 defined by $y_{max}$ and $y_{min}$ for Scenario 2 of the lane change traffic situation, and bottom: The lateral velocity and acceleration trajectory for the ego vehicle's E lane change maneuver, for Scenario 2 of the lane change traffic situation.

In order to traverse a roundabout, the ego vehicle E should merge into the roundabout by positioning itself in an appropriate gap in-between the surrounding vehicles. The aim of the trajectory planning algorithm for the roundabout traffic situation is thereby to plan a trajectory which allows the ego vehicle E to enter the roundabout in the gap in-between surrounding vehicles $S_1$ and $S_2$.

For instance, consider a scenario where surrounding vehicles $S_1$ and $S_2$ are predicted to traverse the roundabout to the same exit as the ego vehicle E, as illustrated in FIG. 8. In this scenario, the planned trajectory of the ego vehicle E is feasible over the prediction horizon if the ego vehicle E is positioned in-between surrounding vehicles $S_1$ and $S_2$ from the point of entering the roundabout. It is assumed that vehicles E, $S_1$ and $S_2$, initially drives at the same longitudinal velocity which is reduced when traversing the roundabout.

The initial conditions for this scenario of the roundabout traffic situation are given in the table illustrated in FIG. 14.

Figure 9:
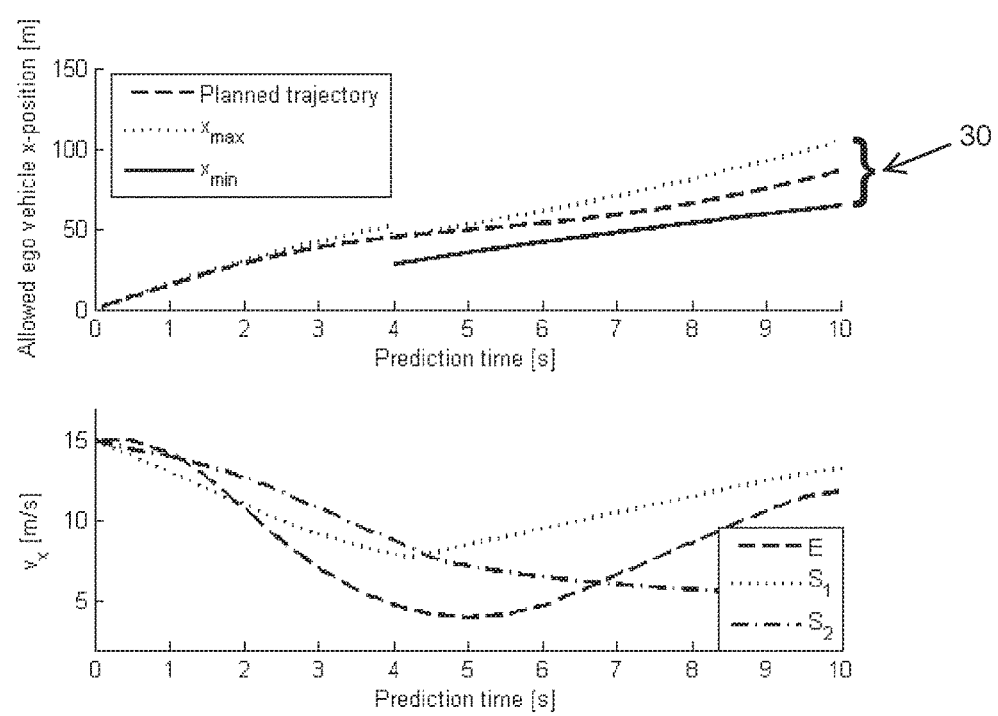
FIG. 9 Top: illustrates longitudinal position trajectory for the ego vehicle's maneuver, respecting the longitudinal safety corridor defined by $x_{max}$, and $x_{min}$ for the roundabout traffic situation.

FIG. 9 displays the longitudinal position trajectory for the ego vehicle's E roundabout maneuver, respecting the longitudinal safety corridor 30 defined by $x_{max}$ and $x_{min}$ for the considered roundabout scenario. In FIG. 9, the roundabout region is defined by the points where the ego vehicle E enters and exits the roundabout and thereby denotes the longitudinal distance for which the ego vehicle E should traverse the roundabout.

It can be noted that prior to the ego vehicle E entering the roundabout the position constraint defined by $x_{max}$, is given by the longitudinal velocity limitation of the maneuver.

FIG. 9 also show the respectively planned and predicted longitudinal velocity trajectories of vehicles E, $S_1$ and $S_2$, from which it can be seen that the vehicles reduces their velocity when traversing the roundabout in order to account for the road geometry.

The lateral safety corridor and the corresponding lateral position trajectory for the roundabout trajectory is primarily defined by the road geometry and thereby not displayed for this traffic situation since the general idea is captured in FIGS. 5-7.

Consider the intersection scenario described above, as shown in FIG. 3, where given the predicted trajectories of surrounding vehicles $S_1$, $S_2$ and $S_3$, the ego vehicle E should traverse the intersection prior to vehicle $S_3$ and after vehicles $S_1$ and $S_2$. The aim of the trajectory planning algorithm for the intersection traffic situation is to plan a maneuver which allows the ego vehicle E to cross the intersection without colliding with surrounding vehicles $S_1$, $S_2$, and $S_3$.

Assuming that surrounding vehicles $S_1$, $S_2$ and $S_3$ drives at constant longitudinal velocity over the prediction horizon according to their predicted trajectories as shown in FIG. 3, the regions where the predicted trajectories of the surrounding vehicles intersect with the planned route of the ego vehicle E can be determined. The resulting longitudinal safety corridor and corresponding motion trajectory for the ego vehicle E is shown in FIG. 10.

Figure 10:
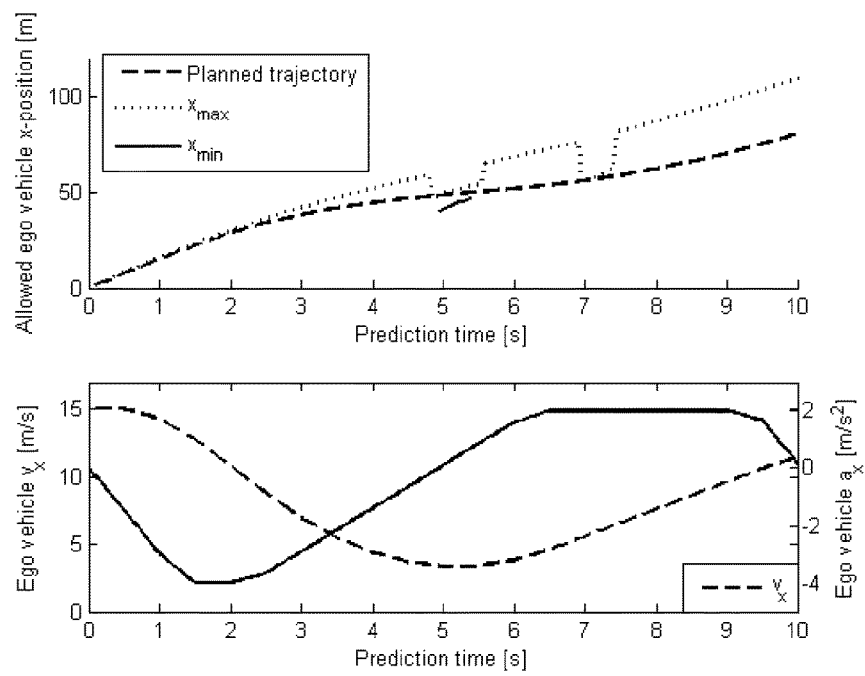
FIG. 10 Top: illustrates longitudinal position trajectory for the ego vehicle's maneuver, respecting the longitudinal safety corridor defined by $x_{max}$, and $x_{min}$ for the intersection traffic situation.

FIG. 10 illustrates: top: The longitudinal position trajectory for the ego vehicle's E maneuver, respecting the longitudinal safety corridor defined by $x_{max}$, and $x_{min}$ for the intersection traffic situation, and bottom: Longitudinal velocity and acceleration trajectory of the ego vehicle E for the intersection traffic situation.

The initial conditions for this scenario of the considered intersection traffic situation are given in the table illustrated in FIG. 15.

In FIG. 10, the intersection region is defined by the points where the ego vehicle E enters and exits the intersection and thereby denotes the longitudinal distance for which the ego vehicle E should traverse the intersection. It can be noted that besides the two drops in the position constraint, $x_{max}$, resulting from $S_1$ and $S_2$, the maximal longitudinal position is given by the longitudinal velocity limitation of the maneuver.

Similar to the roundabout traffic situation, for the intersection traffic situation the lateral safety corridor and the corresponding lateral position trajectory for the crossing maneuver is primarily defined by the road geometry and thereby not displayed for this traffic situation since the general idea is captured in FIGS. 5-7.

Further, in accordance with the method proposed herein it is possible to choose to only perform/evaluate or use part of either trajectory, i.e. part of the prediction time to: inform, warn, support or evaluate a vehicle driver, i.e. if the driver requires information in order to perform a maneuver, requires a warning because a high risk maneuver has been initiated, requires support through the maneuver being performed by an ADAS whilst the driver supervises performance thereof, performance/abortion of an autonomous maneuver, or for evaluating the behavior of the driver, e.g. in terms of which margins the driver keeps to surrounding objects during a certain type of maneuver. It may also be used to predict/evaluate the intentions of other road user, such as other vehicles and pedestrians. This is enabled through considering any road user as the ego vehicle E and applying the method.

In accordance with the present application is also envisaged an Advanced Driver Assistance Systems arranged to implement the method of trajectory planning for yielding maneuvers as described in the foregoing. In that regard, the system may comprise a controller or control unit which may comprise one or more microprocessors, microcontrollers, programmable digital signal processors (DSP) or other programmable devices. The controller or control unit may also, or instead, include one or more application specific integrated circuits (ASIC), programmable gate arrays or programmable array logic, programmable logic devices, or digital signal processors. Where the controller or control unit includes a programmable device such as a microprocessor, microcontroller or programmable digital signal processor, the controller or control unit may also comprise a memory or memory unit which may store computer executable instructions that control operation of the programmable device and/or for performing the various operations and/or functions described herein.

In accordance with the present application is also envisaged a vehicle comprising an Advanced Driver Assistance Systems arranged to implement the method of trajectory planning for yielding maneuvers as described in the foregoing.

Thus, while there have been shown and described and pointed out fundamental novel features of the embodiments herein, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are equivalent. Moreover, it should be recognized that structures and/or elements and/or method steps shown and/or described in connection with any disclosed form or embodiment herein may be incorporated in any other disclosed or described or suggested form or embodiment as a general matter of design choice.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method of trajectory planning for yielding maneuvers for an ego vehicle (E) performed by a controller mounted in the ego vehicle (E), the method comprising:
    determining a longitudinal safety corridor for the ego vehicle (E) that allows the ego vehicle (E) to longitudinally position itself between two or more surrounding objects;
    determining a longitudinal trajectory for the ego vehicle (E) respecting bounds given by the longitudinal safety corridor;
    determining a lateral safety corridor for the ego vehicle (E) using the longitudinal trajectory to determine upper and lower bounds on a lateral position of the ego vehicle (E); and
    determining a lateral trajectory for the ego vehicle (E) respecting bounds given by the lateral safety corridor;
    wherein determining a longitudinal safety corridor for the ego vehicle (E) is arranged to allow the ego vehicle (E) to longitudinally position itself in-between two or more surrounding objects during at least a minimum time required to pass through a yielding region.

2. The method according to claim 1 wherein the minimum time required to pass through a yielding region for a roundabout corresponds to the time required for the ego vehicle (E) to completely enter the roundabout, and for an intersection the time required for the ego vehicle (E) to completely traverse the intersection, and for a lane change the time required for the ego vehicle (E) to completely leave a lane originally travelled and fully enter an adjacent lane.

3. The method according to claim 1 wherein at least one of the longitudinal and lateral trajectories for the ego vehicle (E) is determined through formulating and solving a respective trajectory planning optimization problem.

4. The method according to claim 3 wherein the longitudinal and lateral trajectory planning problems are defined as two loosely coupled longitudinal and lateral low-complexity receding horizon optimal control problems within a Model Predictive Control (MPC) framework.

5. The method according to claim 1 wherein predicted trajectories of the surrounding objects are considered when defining the longitudinal safety corridor.

6. The method according to claim 1 wherein determining a longitudinal safety corridor for the ego vehicle (E) and determining a longitudinal trajectory for the ego vehicle (E) are iterated over several gaps in-between two or more surrounding objects in order to find the most appropriate gap for performing the maneuver.

7. The method according to claim 6 wherein the most appropriate gap in-between two or more surrounding objects for performing the maneuver is selected corresponding to the longitudinal optimization problem which has the best performance index.

8. The method according to claim 1 wherein determining a longitudinal safety corridor for the ego vehicle (E) and determining a longitudinal trajectory for the ego vehicle (E) are iterated in order to find a suitable time for when to initiate the maneuver.

9. The method according to claim 8 wherein the most appropriate time for when to initiate the maneuver is set as the time which corresponds to the longitudinal trajectory planning optimization problem which has the best performance index.

10. The method according to claim 1 wherein at least part of one of the longitudinal and lateral trajectories for the ego vehicle (E) is utilized to determine longitudinal and/or lateral control signals.

11. The method according to claim 10 further comprising combining the longitudinal and lateral control signals to a combined control signal for a combined longitudinal and lateral yielding maneuver of the ego vehicle (E).

12. A driver assistance system for trajectory planning for yielding maneuvers, the system comprising:
  a controller configured to:
    determine a longitudinal safety corridor for the ego vehicle (E) that allows the ego vehicle (E) to longitudinally position itself between two or more surrounding objects;
    determine a longitudinal trajectory for the ego vehicle (E) respecting bounds given by the longitudinal safety corridor;
    determine a lateral safety corridor for the ego vehicle (E) using the longitudinal trajectory to determine upper and lower bounds on a lateral position of the ego vehicle (E); and
    determine a lateral trajectory for the ego vehicle (E) respecting bounds given by the lateral safety corridor;
    wherein determining a longitudinal safety corridor for the ego vehicle (E) is arranged to allow the ego vehicle (E) to longitudinally position itself in-between two or more surrounding objects during at least a minimum time required to pass through a yielding region.

13. The driver assistance system according to claim 12 wherein at least part of one of the longitudinal and lateral trajectories for the ego vehicle (E) is utilized for one or more of the following:
  decide if a maneuver should be imitated or aborted;
  perform a maneuver, autonomously or driver supervised;
  provide driver guidance for performing a maneuver;
  provide driver warning and/or information when a maneuver could and should not be performed;
  predict a future trajectory of a surrounding object; and
  evaluate the behavior of a surrounding object.

14. A vehicle comprising a driver assistance system according to claim 12.

15. A method of trajectory planning for yielding maneuvers for an ego vehicle (E) performed by a controller mounted in the ego vehicle (E), the method comprising:
  determining a longitudinal safety corridor for the ego vehicle (E) that allows the ego vehicle (E) to longitudinally position itself between two or more surrounding objects;
  determining a longitudinal trajectory for the ego vehicle (E) respecting bounds given by the longitudinal safety corridor;
  determining a lateral safety corridor for the ego vehicle (E) using the longitudinal trajectory to determine upper and lower bounds on a lateral position of the ego vehicle (E); and
  determining a lateral trajectory for the ego vehicle (E) respecting bounds given by the lateral safety corridor;
  wherein a yielding maneuver allows the ego vehicle (E) to pass through a yielding region comprising an area in which the ego vehicle (E) yields right-of-way to a surrounding object approaching the area;
  wherein determining a longitudinal safety corridor for the ego vehicle (E) is arranged to allow the ego vehicle (E) to longitudinally position itself in-between two or more surrounding objects during at least a minimum time required to pass through the yielding region.

16. The method according to claim 15 wherein the minimum time required to pass through a yielding region for a roundabout corresponds to the time required for the ego vehicle (E) to completely enter the roundabout, and for an intersection the time required for the ego vehicle (E) to completely traverse the intersection, and for a lane change the time required for the ego vehicle (E) to completely leave a lane originally travelled and fully enter an adjacent lane.

17. The method according to claim 15 wherein a yielding maneuver of the ego vehicle (E) is based on the determined longitudinal trajectory and the determined lateral trajectory.

18. The method according to claim 15 wherein predicted trajectories of the surrounding objects are considered when defining the longitudinal safety corridor.

19. The method according to claim 15 wherein determining a longitudinal safety corridor for the ego vehicle (E) and determining a longitudinal trajectory for the ego vehicle (E) are iterated over several gaps in-between two or more surrounding objects in order to find the most appropriate gap for performing the maneuver.

20. The method according to claim 15 wherein at least part of one of the longitudinal and lateral trajectories for the ego vehicle (E) is utilized to determine longitudinal and/or lateral control signals.

* * * * *